(12) United States Patent  (10) Patent No.: US 9,292,459 B2
Ozawa  (45) Date of Patent: Mar. 22, 2016

(54) OPERATION ANALYSIS APPARATUS, OPERATION ANALYSIS METHOD, AND COMPUTER PROGRAM PRODUCT

(71) Applicant: Kenichi Ozawa, Kanagawa (JP)

(72) Inventor: Kenichi Ozawa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 421 days.

(21) Appl. No.: 13/790,047

(22) Filed: Mar. 8, 2013

(65) Prior Publication Data
US 2013/0246677 A1   Sep. 19, 2013

(30) Foreign Application Priority Data

Mar. 15, 2012  (JP) ................. 2012-058642

(51) Int. Cl.
*G06F 13/36*    (2006.01)
*G06F 13/366*   (2006.01)
G06F 11/34     (2006.01)
G06F 13/362    (2006.01)

(52) U.S. Cl.
CPC .......... *G06F 13/366* (2013.01); *G06F 11/3466* (2013.01); *G06F 11/3476* (2013.01); *G06F 13/362* (2013.01)

(58) Field of Classification Search
CPC ......... G06F 13/16; G06F 13/20; G06F 13/26; G06F 13/362; G06F 11/3466; G06F 11/3476
USPC ................... 710/107–125, 240–244
See application file for complete search history.

(56) References Cited

U.S. PATENT DOCUMENTS

| 5,509,125 | A  | * | 4/1996  | Johnson et al. ............... 710/120 |
| 6,073,199 | A  | * | 6/2000  | Cohen et al. .................. 710/113 |
| 6,473,841 | B1 | * | 10/2002 | Ueda et al. .................... 711/156 |
| 6,944,698 | B2 | * | 9/2005  | Harding et al. ............... 710/113 |
| 7,350,003 | B2 | * | 3/2008  | Gish et al. ..................... 710/241 |
| 8,468,283 | B2 | * | 6/2013  | Petty, Jr. ........................ 710/241 |
| 8,731,688 | B2 | * | 5/2014  | Yamazaki et al. .............. 700/17 |

FOREIGN PATENT DOCUMENTS

JP   2004-334774   11/2004

* cited by examiner

*Primary Examiner* — Brian Misiura
(74) *Attorney, Agent, or Firm* — Harness, Dickey & Pierce, PLC

(57) ABSTRACT

An image forming apparatus includes a storage unit, an arbitration unit that controls access to the storage unit, and a plurality of image processing units that are connected to the arbitration unit and access the storage unit via the arbitration unit. And, an operation analysis apparatus includes: an access monitoring unit monitoring which of the image processing units the arbitration unit permits access to the storage unit; a log generation unit generating, in response to the fact that the access monitoring unit detects that the image processing unit with access permitted has been switched, information on the image processing unit with access permitted as a log; a log storage unit storing therein the generated log; and a remaining capacity determination unit determining whether the storage capacity of the log storage unit after storing the log has become equal to or smaller than a particular capacity.

21 Claims, 14 Drawing Sheets

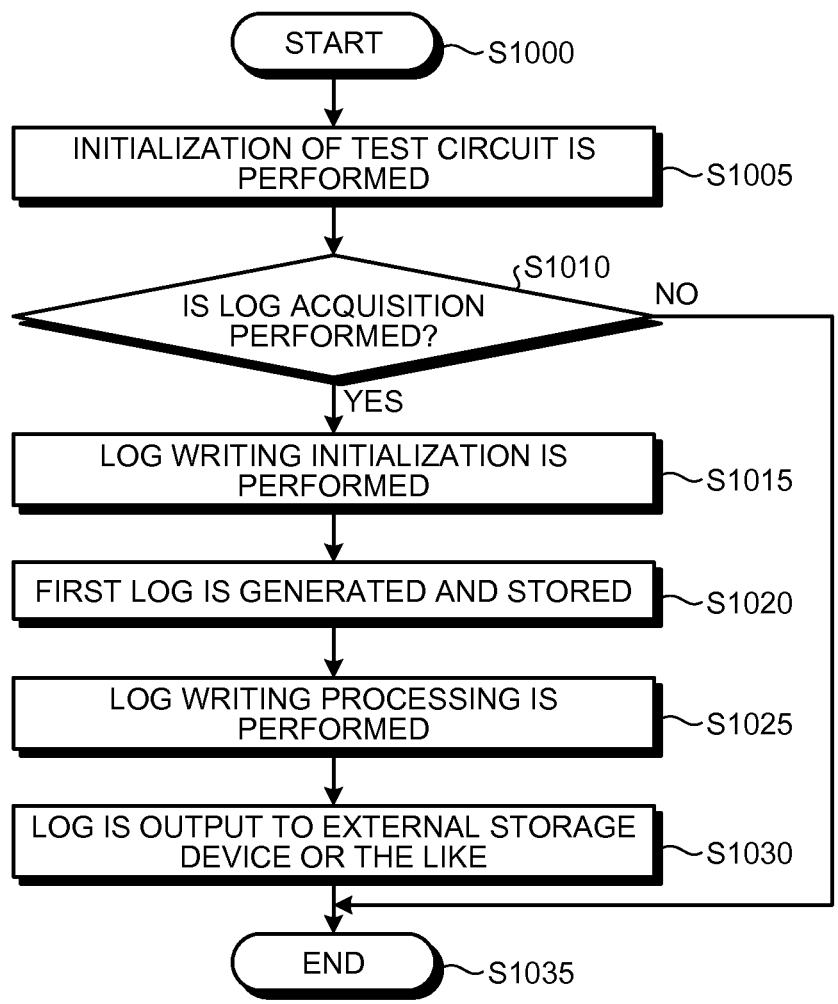

FIG.11

| MODE NUMBER | PRESENCE OR ABSENCE OF LOG | TIMING OF STARTING LOG ACQUISITION | CONTENTS OF ACQUIRED LOG |
|---|---|---|---|
| 1 | ABSENT | - | - |
| 2 | PRESENT | TIMING OF FIRST MEMORY ACCESS | ONLY INFORMATION ON MODULE OCCUPYING BUS |
| 3 | PRESENT | | INFORMATION ON BUS OCCUPATION MODULE AND OCCUPATION TIME |
| 4 | PRESENT | TIMING OF FIRST OCCUPATION OF BUS BY ARBITRARY MODULE | ONLY INFORMATION ON MODULE OCCUPYING BUS |
| 5 | PRESENT | | INFORMATION ON BUS OCCUPATION MODULE AND OCCUPATION TIME |
| 6 | PRESENT | TIMING WHEN PREDETERMINED TIME AFTER FIRST MEMORY ACCESS HAS ELAPSED | ONLY INFORMATION ON MODULE OCCUPYING BUS |
| 7 | PRESENT | | INFORMATION ON BUS OCCUPATION MODULE AND OCCUPATION TIME |

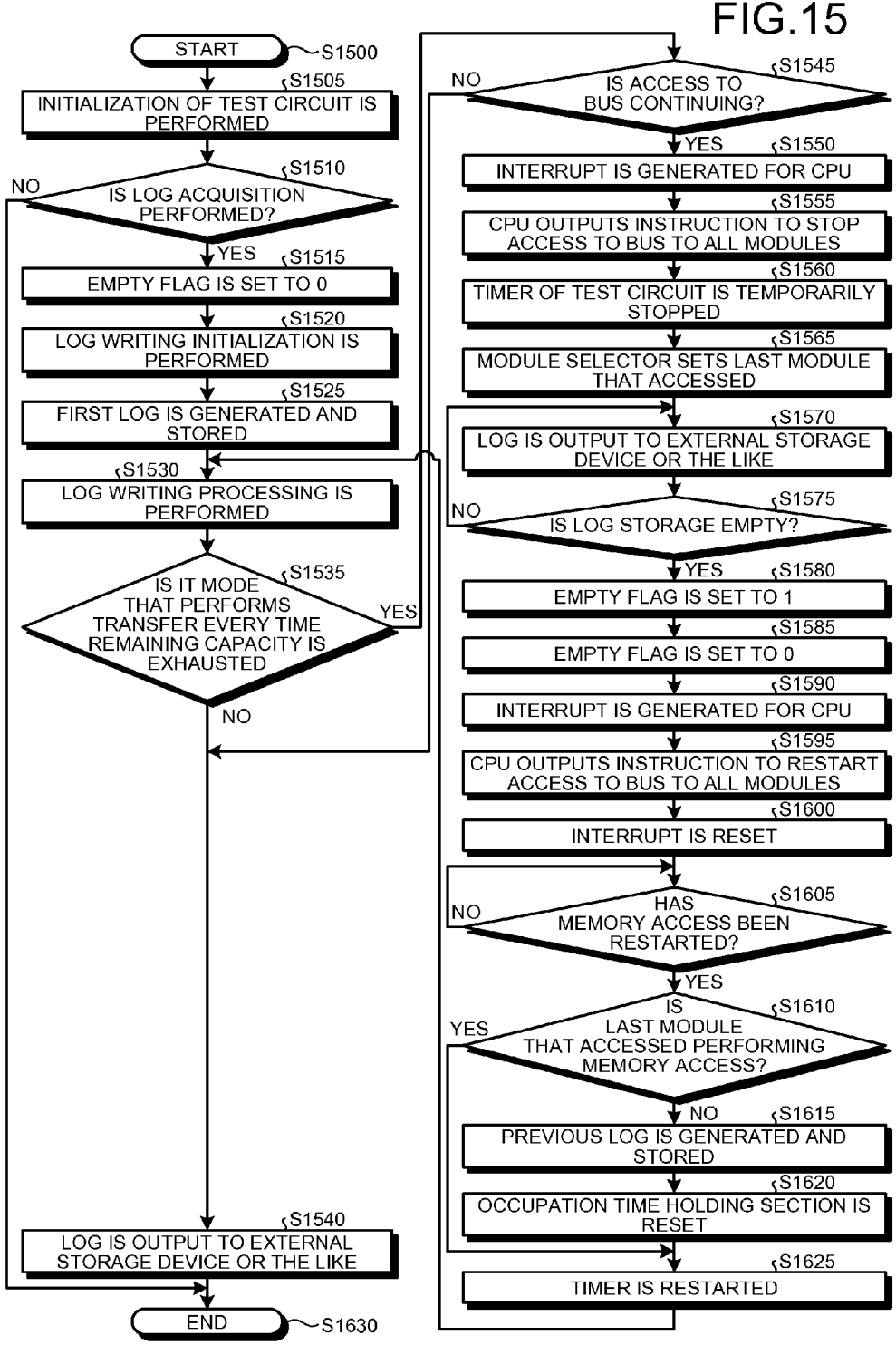

OPERATION ANALYSIS APPARATUS, OPERATION ANALYSIS METHOD, AND COMPUTER PROGRAM PRODUCT

CROSS-REFERENCE TO RELATED APPLICATIONS

The present application claims priority to and incorporates by reference the entire contents of Japanese Patent Application No. 2012-058642 filed in Japan on Mar. 15, 2012.

BACKGROUND OF THE INVENTION

1. Field of the Invention

The present invention relates to an operation analysis apparatus for analyzing the operation of an arbitration circuit for arbitrating access to a memory, a method for analyzing the operations thereof, and a computer program product that contains a computer-readable program for executing the method.

2. Description of the Related Art

Controllers employed in image forming apparatuses, PCs, or the like have a circuit configuration in which a plurality of interfaces (I/Fs) are connected to one bus. This type of controller allows only one I/F to have a bus use right at a moment and prevents a plurality of I/Fs from using the bus simultaneously. In order to arbitrate the use of the bus by a plurality of I/Fs, the controller includes an arbiter as an arbitration circuit.

The arbiter determines the degree of priority for using the bus, provides one of the I/Fs with a right of use in accordance with the degree of priority, and allows the I/F to access the bus. An I/F that is assigned a low degree of priority, therefore, gains little improvement in system performance by I/F speedup when access requests from the I/Fs conflict.

In view of the above, an arbiter has been developed that is provided with a function of switching the degree of priority to allow even an I/F with a low degree of priority to ensure performance.

In order to check this function, however, the I/Fs are required to be operated simultaneously. Under circumstances where the circuit scale has increased and functions of I/Fs have become complicated in recent years, it has become difficult to perform the checking easily.

With this being the situation, a controller has been developed that can check the operation of an arbiter easily without operating the I/Fs (see Japanese Patent Application Laid-open No. 2004-334774). This controller is a device in which a plurality of direct memory access (DMA) circuits access a common memory, and includes interface circuits to which respective DMA circuits are connected, an arbitration circuit that arbitrates an access request from each DMA circuit, and a control circuit that starts up the DMA circuits simultaneously and checks the operation of the arbitration circuit by bypassing the interface circuits.

Although the adoption of the controller described in Japanese Patent Application Laid-open No. 2004-334774 can perform the operation checking of the arbiter, this operation checking is the checking of the degree of priority without consideration of the operation of each I/F.

In addition, it cannot be checked whether the degree of priority of the arbiter is switched as the designer intends during actual operation. When unintentional performance problems or malfunction occur, it is hard to analyze what the problem is.

Given these circumstances, there is needed to provide an apparatus and method that can record the order of priority of an arbiter in operation in a bus to which a plurality of I/Fs are connected and analyze the operation thereof, and in particular, an apparatus and method that records in what order a plurality of image processing units in an image forming apparatus access a memory, thereby allowing the way the arbiter operates to be analyzed.

SUMMARY OF THE INVENTION

It is an object of the present invention to at least partially solve the problems in the conventional technology.

According to the present invention, there is provided: an operation analysis apparatus for analyzing operation of an arbitration unit included in an image forming apparatus comprising a storage unit, the arbitration unit configured to control access to the storage unit, and a plurality of image processing units configured to be connected to the arbitration unit, access the storage unit via the arbitration unit, and perform respective different pieces of image processing on image data.

In the operation analysis apparatus mentioned above, the operation analysis apparatus comprises: an access monitoring unit configured to monitor which of the image processing units the arbitration unit permits access to the storage unit; a log generation unit configured to, in response to the fact that the access monitoring unit detects that the arbitration unit has switched the image processing unit with access to the storage unit permitted, generate information on the image processing unit with access permitted as a log; a log storage unit configured to store therein the generated log; and a remaining capacity determination unit configured to determine whether the storage capacity of the log storage unit after storing the log has become equal to or smaller than a particular capacity.

The present invention also provides an image forming apparatus comprising the operation analysis apparatus mentioned above.

The present invention also provides an operation analysis method that is performed by an operation analysis apparatus for analyzing operation of an arbitration unit included in an image forming apparatus comprising a storage unit, the arbitration unit configured to control access to the storage unit, and a plurality of image processing units configured to be connected to the arbitration unit, access the storage unit via the arbitration unit, and perform respective different pieces of image processing on image data. And, the operation analysis method comprises: monitoring which of the image processing units the arbitration unit permits access to the storage unit; generating, in response to the fact that it is detected the arbitration unit has switched the image processing unit with access to the storage unit permitted, information on the image processing unit with access permitted as a log; storing the generated log in a log storage unit; and determining whether the storage capacity of the log storage unit after storing the log has become equal to or smaller than a particular capacity.

The present invention also provides a computer program product comprising a non-transitory computer-readable medium having a computer-readable program for executing an operation analysis method that is performed by an operation analysis apparatus for analyzing operation of an arbitration unit included in an image forming apparatus comprising a storage unit, the arbitration unit configured to control access to the storage unit, and a plurality of image processing units configured to be connected to the arbitration unit, access the storage unit via the arbitration unit, and perform respective different pieces of image processing on image data.

In the computer program product mentioned above, the operation analysis method comprises: monitoring which of the image processing units the arbitration unit permits access to the storage unit; generating, in response to the fact that it is detected the arbitration unit has switched the image processing unit with access to the storage unit permitted, information on the image processing unit with access permitted as a log; storing the generated log in a log storage unit; and determining whether the storage capacity of the log storage unit after storing the log has become equal to or smaller than a particular capacity.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a flowchart illustrating the flow of processing performed by the operation analysis apparatus illustrated in FIG. 9;

FIG. 11 is a diagram exemplifying a log acquisition mode combination table used when a mode selection section illustrated in FIG. 9 sets a mode;

FIG. 15 is a flowchart illustrating the flow of processing performed by the operation analysis apparatus illustrated in FIG. 14.

DETAILED DESCRIPTION OF THE PREFERRED EMBODIMENTS

Figure 1:
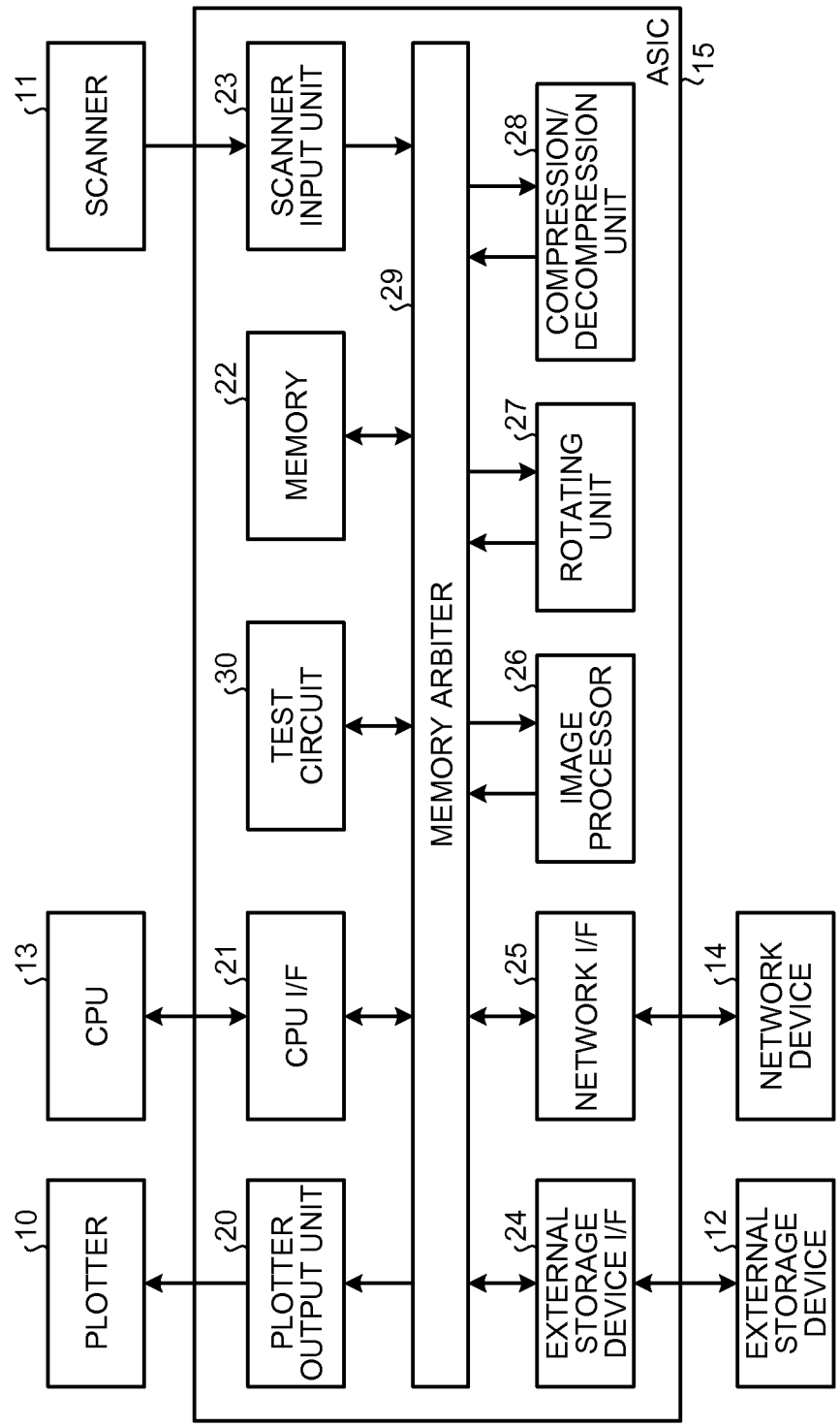
FIG. 1 is a hardware configuration diagram of an image forming apparatus including an operation analysis apparatus in embodiments of the present invention.

FIG. 1 is a hardware configuration diagram of an image forming apparatus including an operation analysis apparatus in an embodiment of the present invention. The image forming apparatus may be a printer, scanner, fax machine, multi function peripheral (MFP), or the like. In FIG. 1, the image forming apparatus is an MFP including a printing function and a scanner function.

The image forming apparatus illustrated in FIG. 1 includes, as hardware, a plotter 10, a scanner 11, an external storage device 12, a CPU 13, a network device 14, and an application specific integrated circuit (ASIC) 15. The plotter 10 is, for example, an electrophotographic printing device, which forms a toner image on a sheet on the basis of CMYK four-color image data, and fixes and outputs it.

The plotter 10 is not limited to the above-described color printing device and may be a monochrome printing device. Alternatively, the plotter 10 may be an ink jet plotter that applies ink droplets on a sheet to form an image.

The scanner 11 may be, for example, an apparatus that reads each line in a document in the main-scanning direction by a color line sensor using a charge coupled device (CCD), moves the document in the sub-scanning direction, and forms image data provided with predetermined tones for the RGB components.

The scanner 11 is not limited to the above-described apparatus, and may use a complementary metal oxide semiconductor (CMOS) or may have a configuration that moves the color line sensor instead of the document.

The external storage device 12 is, for example, an HDD, which stores therein, in addition to image data, computer programs, parameters, font data, and the like. The external storage device 12 functions also as a log storage unit and is used for storing therein logs. The external storage device 12 may be a writable CD-ROM, DVD, SD card, universal serial bus (USB) memory, solid state drive (SSD), or the like.

The CPU 13 takes control of blocks other than the CPU to control the entire image forming apparatus. This control can be performed by executing programs stored in the external storage device 12.

The network device 14 is, for example, a network interface card (NIC) and is connected to a network such as a local area network (LAN, not illustrated), allowing communication with other devices connected to the network. This communication can be performed using a protocol such as TCP/IP, FTP, and HTTP.

The ASIC 15 is connected to the plotter 10, the scanner 11, the external storage device 12, the CPU 13, and the network device 14 via a bus (not illustrated). The ASIC 15 includes a plotter output unit 20, a CPU I/F 21, a memory 22, a scanner input unit 23, an external storage device I/F 24, a network I/F 25, an image processor 26, a rotating unit 27, a compression/decompression unit 28, and a memory arbiter 29 as an arbitration unit, all connected via an internal bus. The ASIC 15 additionally includes a test circuit 30 as one of the ASIC functions.

The plotter output unit 20 reads the image data stored in the external storage device 12, converts the read RGB image data into CMYK image data, and performs dither processing, which is color reduction processing on image data, to transfer binary data of respective CMYK colors to the plotter 10.

The CPU I/F 21 functions as a buffer that absorbs a frequency difference between the CPU 13 and the ASIC 15, and performs transmission and reception of data between the ASIC functional blocks.

The memory 22 is, for example, a RAM or an NVRAM, which is used by the CPU 13 as a working memory when the CPU 13 executes programs. In the present embodiment, part of the memory area of the memory 22 is used also for temporarily storing therein logs, which will be described later.

The scanner input unit 23, on the basis of the CCD characteristics of the scanner 11 acquired in advance, performs a variety of types of image processing such as shading correction processing, filtering processing, and color conversion processing on image data.

The external storage device I/F 24 performs processing of writing data into the external storage device 12 and reading the data from the external storage device 12. The network I/F 25 accesses a network such as a LAN, monitors the media access control (MAC) address of a destination of data on the network, selectively captures data into the image forming apparatus, and issues an interrupt to the CPU 13 and other components to control them. The network I/F 25, upon receiving a data transmission request from the CPU 13, outputs the data to the network, with the MAC addresses of the image forming apparatus and the destination added.

The image processor 26, the rotating unit 27, and the compression/decompression unit 28 perform image processing, rotation processing, and compression/decompression processing, respectively, on the image data of an image scanned by the scanner 11 or image data to be transferred to the plotter 10. When the degree of priority of processing is fixed, the memory arbiter 29 determines one module for which access to the memory 22 is permitted in accordance with the degree of priority, and provides the module with a right of use. The memory arbiter 29 may include a counter therewithin to successively change modules to which a right of use is provided and equally provide all the modules with a right of use. The module is a constituent for achieving one function of the ASIC 15, which is the image processor 26, the rotating unit 27, the compression/decompression unit 28, for example.

Figure 2:
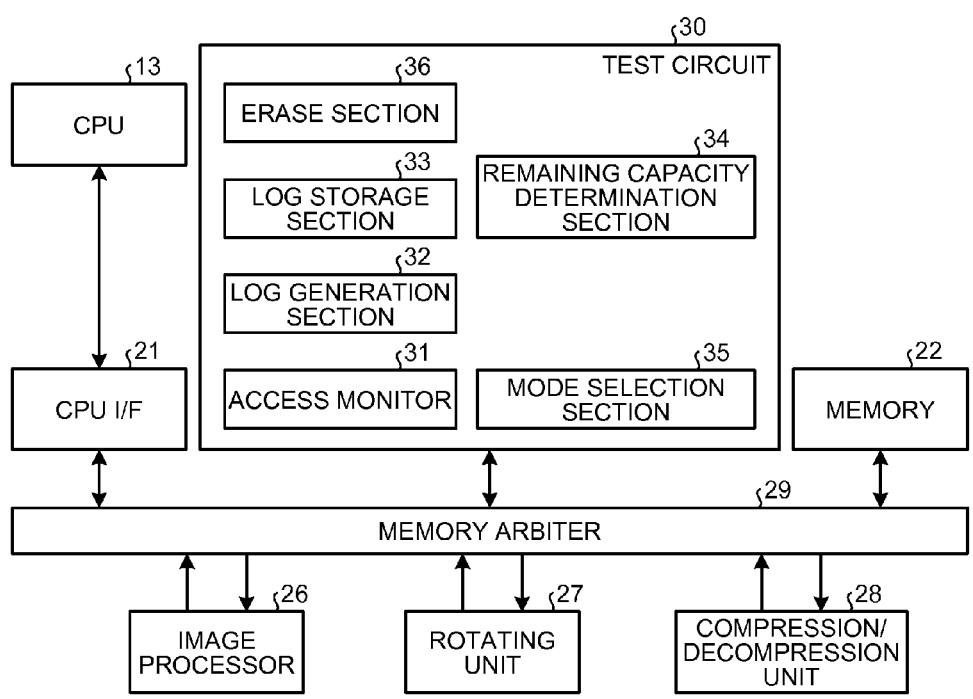
FIG. 2 is a functional block diagram illustrating a first embodiment of the operation analysis apparatus.

The test circuit 30 is a circuit for analyzing the operation of the memory arbiter 29, and functions as an operation analysis apparatus. FIG. 2 is a functional block diagram illustrating one configuration example of this operation analysis apparatus. FIG. 2 illustrates the CPU 13, the CPU I/F 21, the memory 22 as a storage unit, the image processor 26 and the rotating unit 27 and the compression/decompression unit 28 that function as image processing units, and the memory arbiter 29 as the arbitration unit, in addition to the test circuit 30 that functions as the operation analysis apparatus.

The test circuit 30 include an access monitor 31 as an access monitoring unit, a log generation section 32 as a log generation unit, a log storage section 33 as a log storage unit, and a remaining capacity determination section 34 as a remaining capacity determination unit. In FIG. 2, in addition to these, the test circuit includes a mode selection section 35 and an erase section 36 as an erase unit.

The access monitor 31 monitors a module that accesses the memory 22 and detects that the memory arbiter 29 has switched modules. The memory arbiter 29 provides one of the modules outputting access requests to the memory 22 with a right of use for accessing the memory 22 in accordance with the degree of priority. The memory arbiter 29, on completion of the process by the module, cancels the right of use for the module concerned, provides the next module with a right of use, and switches to access by the next module.

The log generation section 32, upon detection of switching of modules by the access monitor 31, receives information telling which module has received permission to access, and generates information on the module, for example, the module name, as a log. The log generation section 32 may also generate information other than a module name. Other information may be date and time when the switching is detected and time during which access to the memory has been occupied.

The log storage section 33 stores therein logs generated by the log generation section 32 in order. The remaining capacity determination section 34 monitors a remaining storage capacity where nothing is stored (remaining capacity) out of the storage capacity possessed by the log storage section 33. The remaining capacity determination section 34 also determines whether the remaining capacity has become equal to or smaller than a particular capacity. The particular capacity may be any capacity and may be set in advance. The log storage section 33 stores therein logs in order until the remaining capacity determination section 34 determines that the storage capacity has become equal to or smaller than the particular capacity.

Storing the logs in order in this manner allows, completion of a series of operations, log data to be output from the log storage section 33 to the memory 22 or the external storage device 12 and analyzed. This analysis checks in what order (priority) memory accesses are being performed. The log data may be output to other storage devices to be stored or may be output to PCs, servers, or the like via a network.

The mode selection section 35, in accordance with selection by a user, sets either a log acquisition mode in which a log is generated to be stored or a normal mode in which no log acquisition is performed. The erase section 36 erases all settings within the test circuit 30 and all logs stored in the log storage section 33. The log generation section 32, therefore, refers to a mode set by the mode selection section 35 and generates a log when the mode is the log acquisition mode in which the log is generated to be stored. The erase section 36 erases the settings and logs within the test circuit 30 when the user selects erasing them or when all logs have been output to the memory 22 or the external storage device 12.

Figure 3:
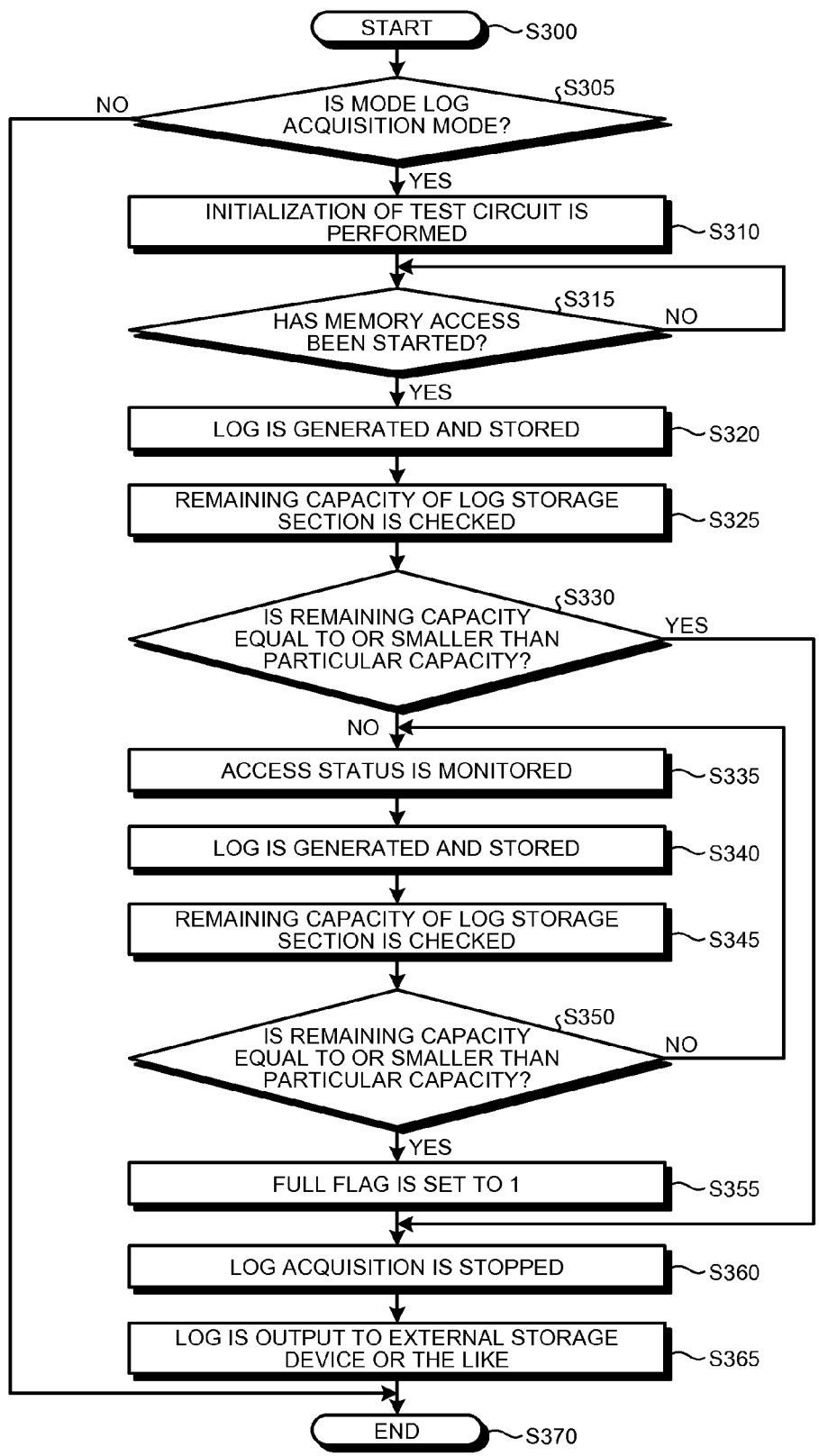
FIG. 3 is a flowchart illustrating the flow of processing performed by the operation analysis apparatus illustrating in FIG. 2.

FIG. 3 is a flowchart illustrating the flow of processing performed by the operation analysis apparatus illustrated in FIG. 2. The operation analysis apparatus, starting the processing from Step S300, first receives selection of a mode by the mode selection section 35 at Step S305 to determine whether the mode is the mode acquisition mode. When the mode is the mode acquisition mode, the flow advances to Step S310. Otherwise, the flow advances to Step S370 to end this processing.

At Step S310, initialization of the test circuit 30 is performed. The processing of this initialization will be described later. At Step S315, the access monitor 31 determines whether a module has started access to the memory 22. This determination can be performed by determining whether access to the memory arbiter 29 has been started.

In response to determination that access to the memory 22 has been started, the log generation section 32 generates a log to be stored in the log storage section 33 at Step S320. The content of the log generated here is module-related information such as module name telling which module is given a right of use from the memory arbiter 29.

The remaining capacity determination section 34 monitors the remaining capacity of the log storage section 33 at Step S325 and determines whether the remaining capacity is equal to or smaller than a particular capacity at Step S330. When the remaining capacity exceeds the particular capacity, the flow advances to Step S335. When the remaining capacity is equal to or smaller than the particular capacity, the flow advances to Step S365.

At Step S335, the access monitor 31 monitors access status to the memory 22 by a module. When the access monitor 31 detects that modules have been switched, the log generation section 32 generates a log and stores the generated log in the log storage section 33 at Step S340. At Step S345, the remaining capacity determination section 34 checks the remaining capacity of the log storage section 33 to determine whether the remaining capacity has become equal to or smaller than the particular capacity.

When it is determined that the remaining capacity has become equal to or smaller than the particular capacity, the flow advances to Step S355. At Step S355, a FULL flag, which is a standard for the remaining capacity of the log storage section 33, is set to 1 indicating that the remaining capacity is equal to or smaller than the particular capacity, and then the flow advances to Step S360. When it is determined that the remaining capacity exceeds the particular capacity, the flow returns to Step S335 because logs can still be stored therein. Subsequently, the monitoring, the generation and storage of a log, the checking and determination of the remaining capacity at Step S335 to Step S350 are performed.

At Step S360, the log generation section 32 stops log generation and log acquisition because the remaining capacity of the log storage section 33 becomes smaller. Logs stored in the log storage section 33 are then output to the memory 22 or the external storage device 12 at Step S365 to end this processing at Step S370.

Figure 4:
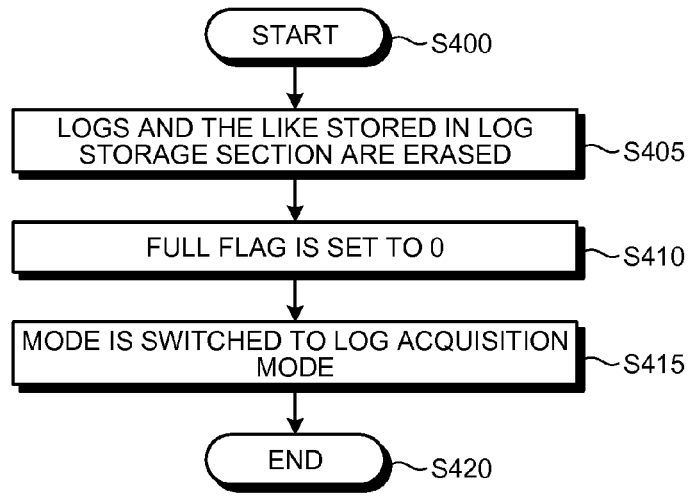
FIG. 4 is a flowchart illustrating the flow of the initialization of a test circuit at Step S310 in FIG. 3.

FIG. 4 is a flowchart illustrating the flow of the initialization of the test circuit 30 at Step S310 in FIG. 3. This processing starts at Step S400, and then at Step S405, the erase section 36 erases all logs stored in the log storage section 33 and all set values of the functions within the test circuit 30. At Step S410, the FULL flag, which is a standard for the remaining capacity of the log storage section 33, is set to 0 indicating that the remaining capacity is larger than the particular capacity.

The default mode is the normal mode. The mode selection section 35 switches the mode to the log acquisition mode at Step S415 and this processing ends at Step S420.

Figure 5:
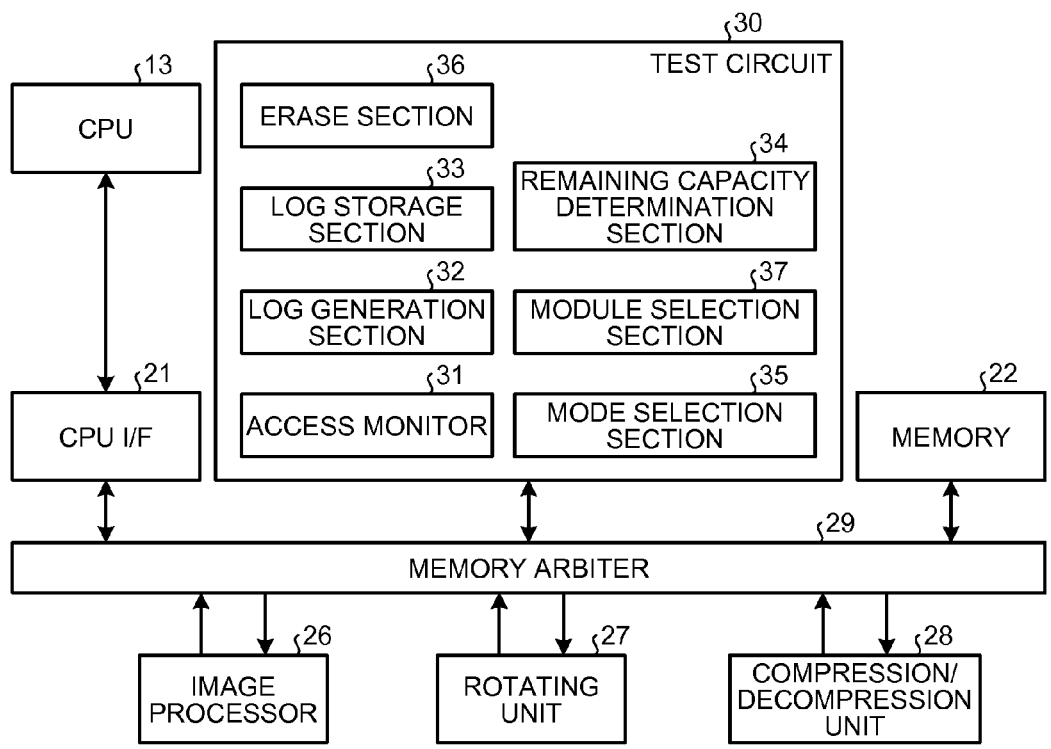
FIG. 5 is a functional block diagram illustrating a second embodiment of the operation analysis apparatus.

FIG. 5 is a functional block diagram illustrating a second embodiment of the operation analysis apparatus. As is the case with FIG. 2, FIG. 5 illustrates the CPU 13, the CPU I/F 21, the memory 22, the image processor 26, the rotating unit 27, the compression/decompression unit 28, and the memory arbiter 29, in addition to test circuit 30.

The test circuit 30 includes the access monitor 31, the log generation section 32, the log storage section 33, the remaining capacity determination section 34, the mode selection section 35, and the erase section 36. The embodiment illustrated in FIG. 5 additionally includes a module selection section 37.

Only the module selection section 37 will be described here because descriptions have been already provided for the access monitor 31, the log generation section 32, the log storage section 33, the remaining capacity determination section 34, the mode selection section 35, and the erase section 36.

In the configuration of the embodiment illustrated in FIG. 2, the start of access to the memory 22 is a start flag for log acquisition. In this case, depending on the storage capacity possessed by the log storage section 33, processing to be checked is complex and later in the process, a log is more likely not to be contained within the storage capacity.

Given these circumstances, by adding the module selection section 37, log acquisition is made to start, not when access to the memory starts, but when a selected module operates first. Specifically, the module selection section 37 receives selection of a module by a user and sets the modules as a start flag for log acquisition. The log generation section 32 starts generation of a log when the set module operates first.

Figure 6:
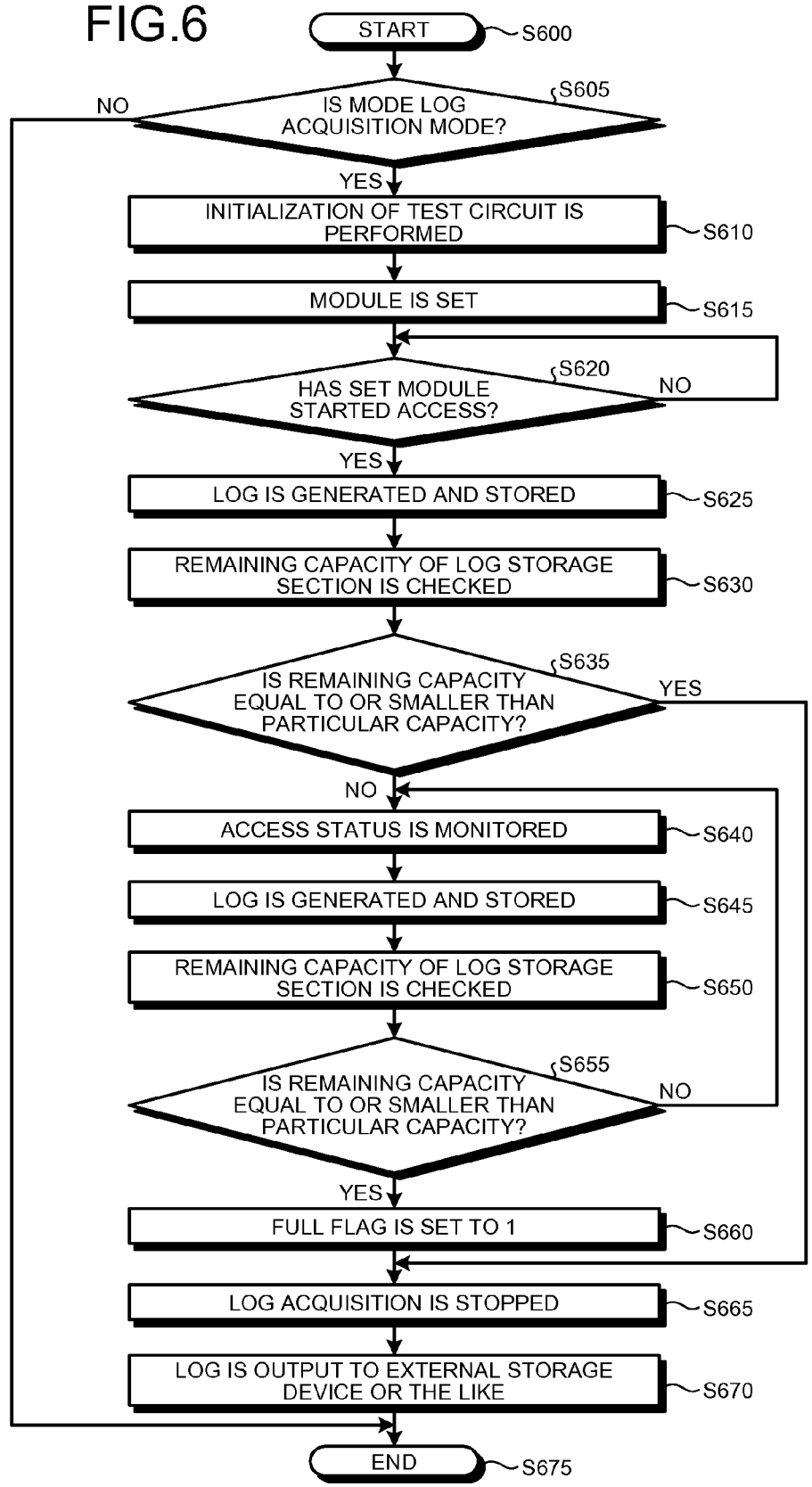
FIG. 6 is a flowchart illustrating the flow of processing performed by the operation analysis apparatus illustrated in FIG. 5.

FIG. 6 is a flowchart illustrating the flow of processing performed by the operation analysis apparatus illustrated in FIG. 5. The operation analysis apparatus, starting the processing at Step S600, first receives selection of a mode by the mode selection section 35 and determines whether the mode is the log acquisition mode at Step S605. When the mode is the log acquisition mode, the flow advances to Step S610. Otherwise, the flow advances to Step S675 to end this processing.

At Step S610, initialization of the test circuit 30 is performed. The processing of this initialization will be described later. At Step S615, a module received by the module selection section 37 is set to be a log generation starting module. At Step S620, it is determined whether the module thus set has started access to the memory 22. This determination continues until the module starts access to the memory 22.

When the access monitor 31 detects that the module has started access to the memory 22, the log generation section 32 generates a log for the module to be stored in the log storage section 33 at Step S625.

The remaining capacity determination section 34 checks the remaining capacity of the log storage section 33 at Step S630 and determines whether the remaining capacity is equal to or smaller than a particular capacity at Step S635. When the remaining capacity exceeds the particular capacity, the flow advances to Step S640. Otherwise, the flow advances to Step S665.

At Step S640, the access monitor 31 monitors the access status to the memory 22 by a module, and detects that modules have been switched. At Step S645, the log generation section 32 generates a log and stores the generated log in the log storage section 33. At Step S650, the remaining capacity determination section 34 then checks the remaining capacity of the log storage section 33, and at Step S655, determines whether the remaining capacity has become equal to or smaller than the particular capacity.

When it is determined that the remaining capacity has become equal to or smaller than the particular capacity, the flow advances to Step S660, where the FULL flag is set to 1, and then advances to Step S665. When it is determined that the remaining capacity exceeds the particular capacity, the flow returns to Step S640, and then the monitoring, the generation and storage of a log, the checking and determination of the remaining capacity are performed at Step S640 to Step S655.

At Step S665, the log generation section 32 stops log generation and log acquisition because the remaining capacity of the log storage section 33 becomes smaller. Logs stored in the log storage section 33 are then output to the memory 22 or the external storage device 12 at Step S670 to end this processing at Step S675.

Figure 7:
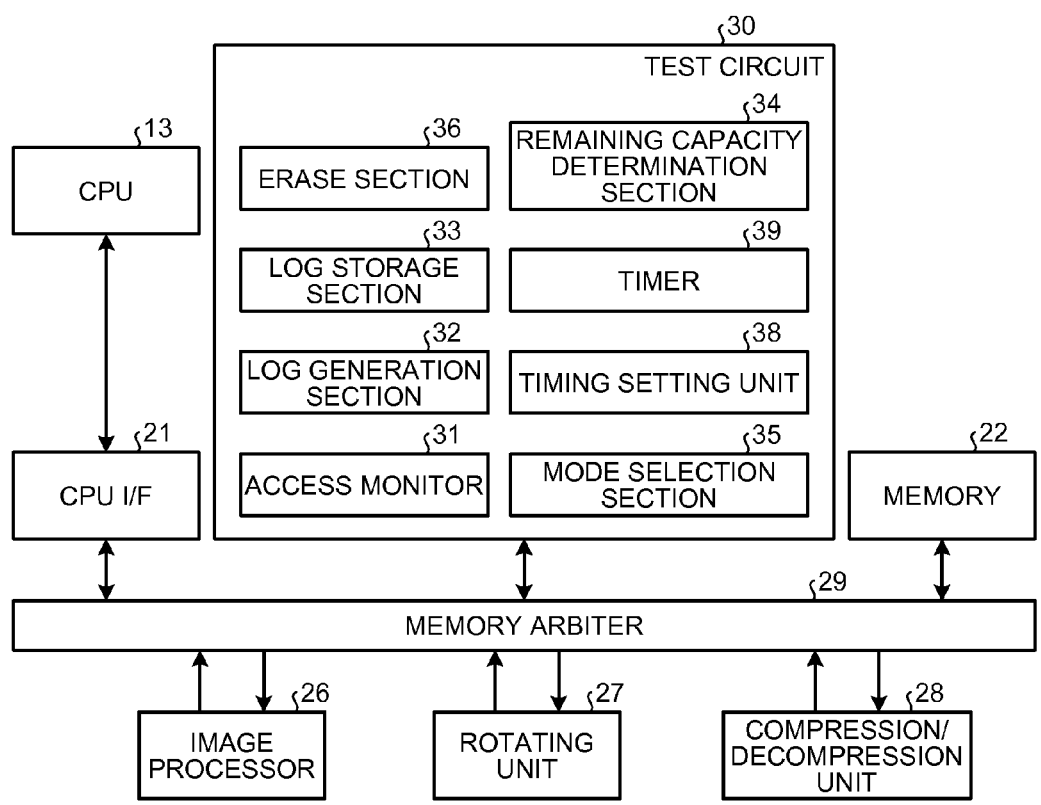
FIG. 7 is a functional block diagram illustrating a third embodiment of the operation analysis apparatus.

FIG. 7 is a functional block diagram illustrating a third embodiment of the operation analysis apparatus. The operation analysis apparatus illustrated in FIG. 7 has a configuration in which a timing setting unit 38 as a setting unit and a timer 39 as a measuring unit for measuring time are added to the configuration illustrated in FIG. 2. The timing setting unit 38 receives time after which generation of a log starts and sets the time. This configuration also controls the timing of log acquisition in order to effectively use the storage capacity of the log storage section 33 as is the case with the embodiment illustrated in FIG. 5. The timing setting unit 38 and the timer 39 will be described here because those other than the timing setting unit 38 and timer 39 have been already described.

The timing setting unit 38, after performing initialization of the test circuit 30, receives time input by a user to be set in order to set the timing of starting log generation in time. The set time is measured by the timer 39. The log generation section 32 starts generating a log when the time measured by the timer 39 has reached the set time.

The timing of starting the timer 39 may be timing when the initialization of the test circuit 30 has ended. The timing, however, is not limited thereto and may be timing when access to the memory arbiter 29 has been started.

Figure 8:
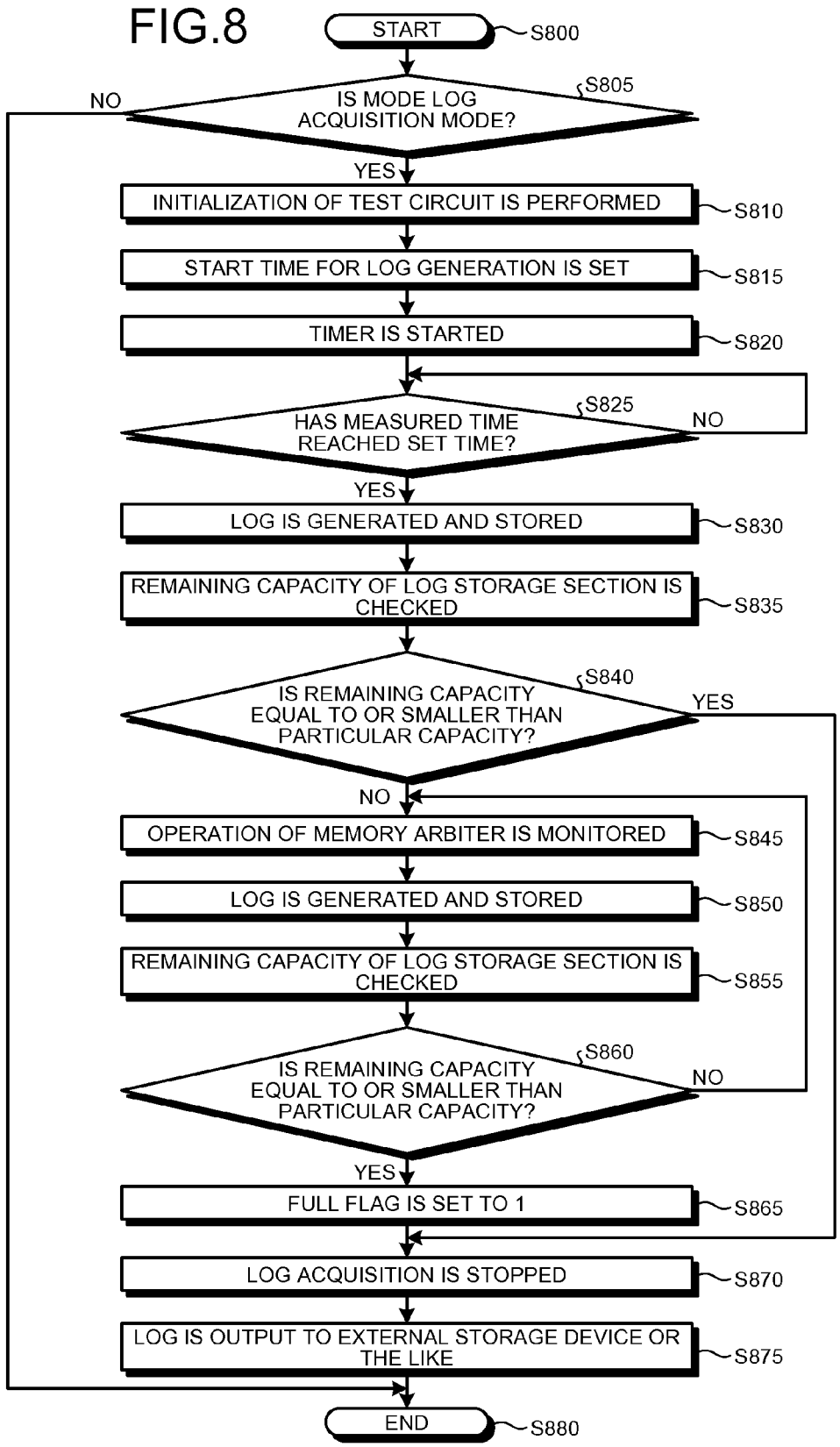
FIG. 8 is a flowchart illustrating the flow of processing performed by the operation analysis apparatus illustrated in FIG. 7.

FIG. 8 is a flowchart illustrating the flow of processing performed by the operation analysis apparatus illustrated in FIG. 7. The operation analysis apparatus, starting the processing at Step S800, first receives selection of a mode by the mode selection section 35 at Step S805 to determine whether the mode is the mode acquisition mode. When the mode is the mode acquisition mode, the flow advances to Step S810. Otherwise, the flow advances to Step S880 to end this processing.

At Step S810, initialization of the test circuit 30 is performed. This processing of the initialization is the same as one described above. At Step S815, the timing setting unit 38 sets time when generation of a log starts. At Step S820, the timer 39 starts. At Step S825, it is determined whether time measured by the timer 39 has reached the time set at Step S815. When the time measured has not reached the time set, this determination is repeated.

When the time measured has reached the time set, by contrast, the flow advances to Step S830, where generation of a log by the log generation section 32 starts. The log generated by the log generation section 32 is stored in the log storage section 33. The processing from this point onward is the same as one described in FIG. 6.

In other words, the remaining capacity determination section 34 checks the remaining capacity of the log storage section 33 at Step S835 to determine whether the remaining capacity is equal to or smaller than a particular capacity at Step S840. When the remaining capacity exceeds the particular capacity, the flow advances to Step S845. When the remaining capacity is equal to or smaller than the particular capacity, the flow advances to Step S870.

At Step S845, when the access monitor 31 monitors access status to the memory 22 by a module and detects that modules have been switched, the log generation section 32 generates a log and stores the generated log in the log storage section 33 at Step S850. The remaining capacity determination section 34 then checks the remaining capacity of the log storage section 33 at Step S855 to determine whether the remaining capacity has become equal to or smaller than the particular capacity at Step S860.

When it is determined that the remaining capacity has become equal to or smaller than the particular capacity, the flow advances to Step S865, where a FULL flag is set to 1, and the flow advances to Step S870. When it is determined that the remaining capacity exceeds the particular capacity, the flow returns to Step S845, and then the monitoring, the generation and storage of a log, the checking and determination of the remaining capacity are performed at Step S845 to Step S860.

At Step S870, the log generation section 32 stops log generation because the remaining capacity of the log storage section 33 becomes smaller. Logs stored in the log storage section 33 are then output to the memory 22 or the external storage device 12 at Step S875 to end this processing at Step S880.

Figure 9:
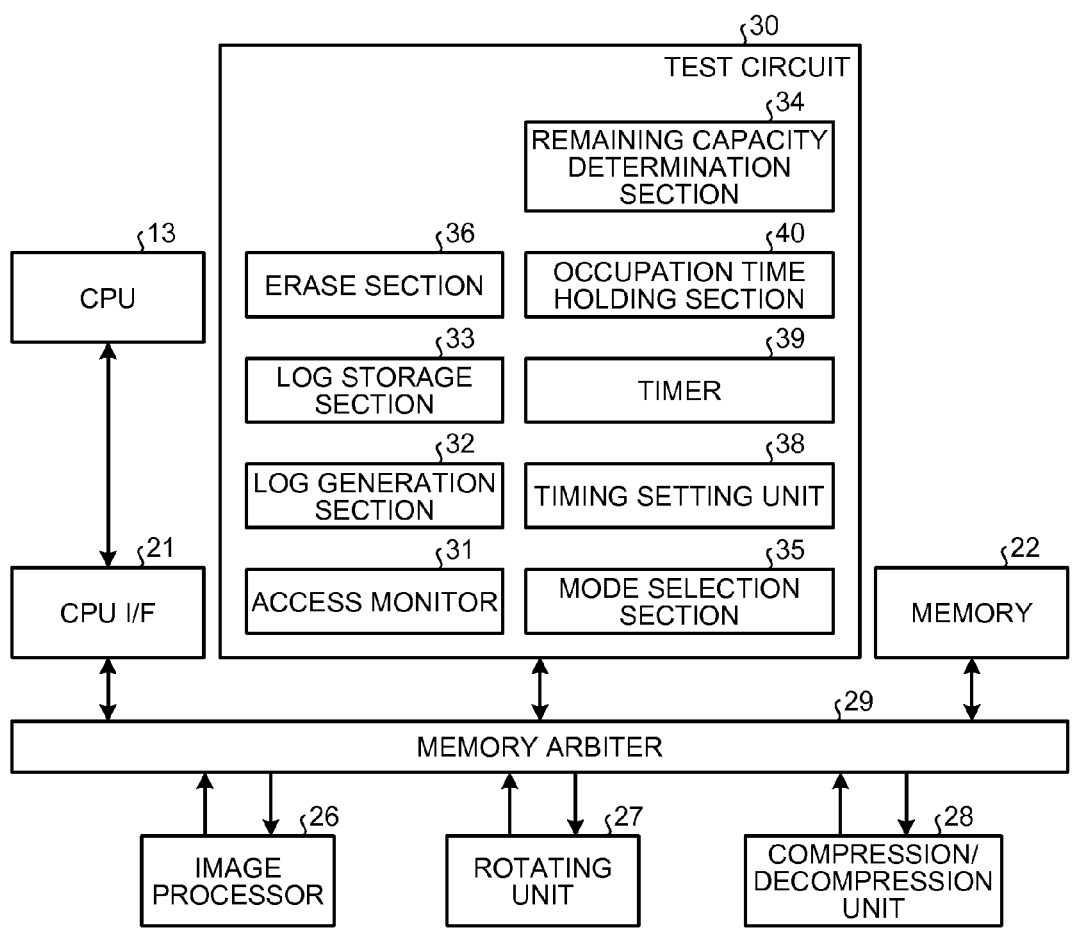
FIG. 9 is a functional block diagram illustrating a fourth embodiment of the operation analysis apparatus.

FIG. 9 is a functional block diagram illustrating a fourth embodiment of the operation analysis apparatus. The operation analysis apparatus illustrated in FIG. 9 has a configuration in which an occupation time holding section 40 as an occupation time holding unit is added in addition to the access monitor 31, the log generation section 32, the log storage section 33, the remaining capacity determination section 34, the mode selection section 35, the erase section 36, the module selection section 37, the timing setting unit 38, and the timer 39 illustrated in FIGS. 2, 5, and 7. Those other than the added occupation time holding section 40 have been already described, and the description therefor will be omitted here.

The occupation time holding section 40 measures, using the timer 39, time during which the memory 22 is occupied by an arbitrary module that is given a right of use from the memory arbiter 29, and records the time as occupation time. The occupation time may be, for example, a period from when the module first starts memory access to when the next module starts memory access. This is an example, and the occupation time is not limited thereto.

When the occupation time holding section 40 is provided, a log including occupation time recorded at all times may be stored in the log storage section 33. However, depending on a mode received and set by the mode selection section 35, only module-related information may be stored as a log in the log storage section 33.

FIG. 10 is a flowchart illustrating the flow of processing performed by the operation analysis apparatus illustrated in FIG. 9. This processing starts at Step S1000, and initialization of the test circuit 30 is performed at Step S1005. Although the foregoing embodiments perform processing in which the log acquisition mode is always set, this embodiment performs this initialization first, because the number of operation modes is large.

The flow of processing in the initialization is the same as the flow of processing illustrated in FIG. 3. However, mode identification information for identifying a mode is set because the number of modes is large. The mode identification information includes, as an example, a mode number that is assigned corresponding to a mode.

At Step S1010, it is determined whether log acquisition is performed on the basis of a set mode number. When no log is to be acquired, the flow advances to Step S1035 to end this processing. When log acquisition is performed, by contrast, the flow advances to Step S1015, where log-writing initialization is performed to control recording, as a log, which module has given a right of use and permission of access. This writing initialization is control for performing initialization in accordance with each operation mode before starting log writing, whose details will be described later.

On completion of this initialization, the flow advances to Step S1020, where the log generation section 32 generates a first log and stores the log in the log storage section 33. Subsequently, log-writing processing is performed at Step S1025. This writing processing is processing including waiting for the above-described switching of modules to check the remaining capacity of the log storage section 33. The details of this processing will be also described later. At Step S1030, on completion of all the operations, logs are output to the memory 22 or the external storage device 12 to end this processing at Step S1035. The logs output to the memory 22 or the external storage device 12 will be analyzed later.

FIG. 11 is a diagram exemplifying a log acquisition mode combination table used in the initialization of the test circuit 30 at Step S1005 in FIG. 10. In this table, a mode number for identifying a mode to be set in the initialization is correlated with the presence or absence of a log, timing of starting log acquisition, and the content of an acquired log. The timing of starting log acquisition is timing of first memory access to the memory 22, timing of first occupation of a bus by an arbitrary module, and timing when an arbitrary time after the first access to the memory 22 has elapsed. Measurement of occupation time performed by the occupation time holding section 40 using the timer 39 is performed using these kinds of timing.

The content of an acquired log includes information on a module occupying the bus, that is, only the name of the module or both the module information and bus occupation time. The content may, however, not be limited thereto, and may include other information as needed.

Figure 12:
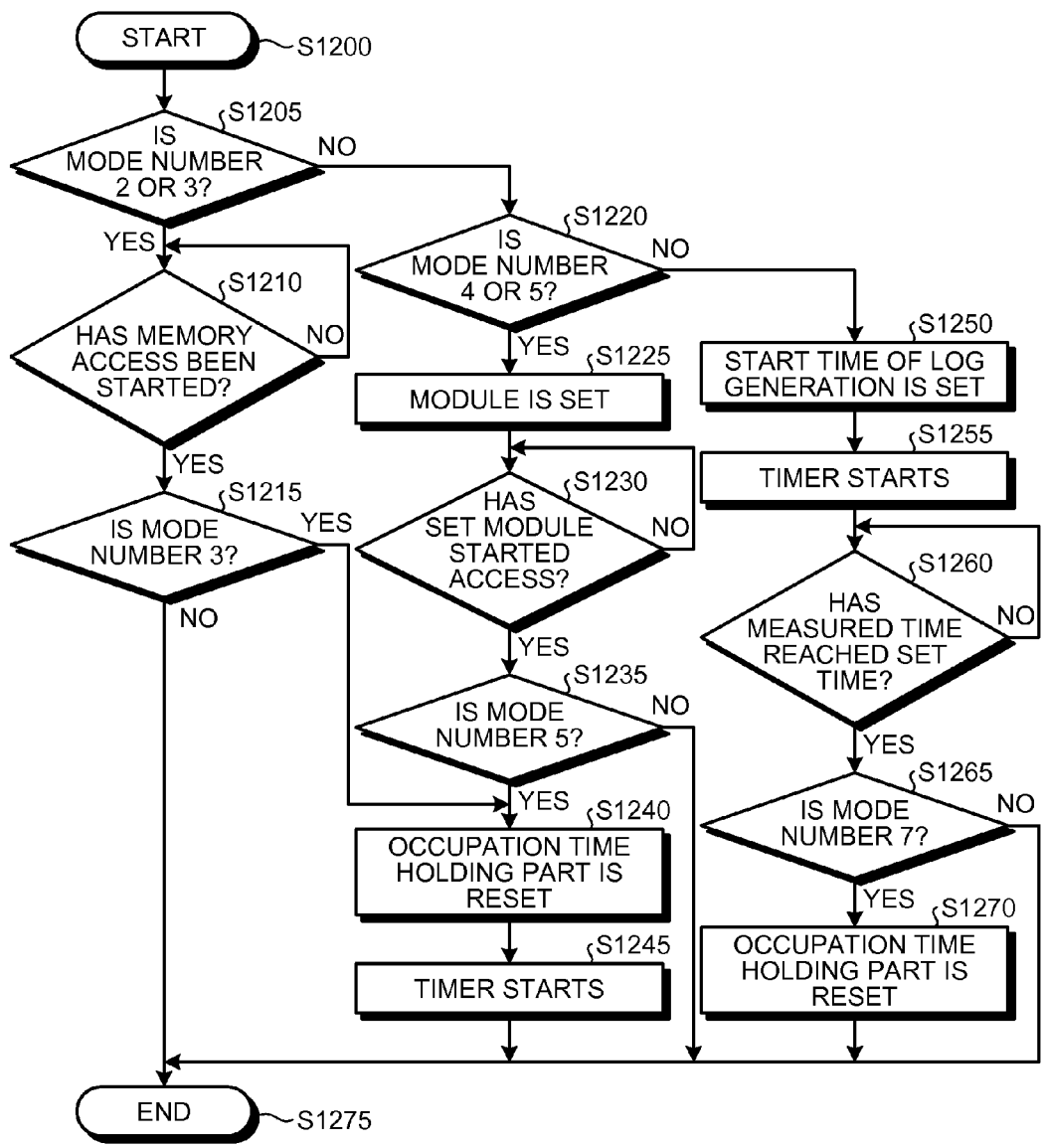
FIG. 12 is a flowchart illustrating the flow of writing initialization at Step S1015 in FIG. 10.

FIG. 12 is a flowchart illustrating the flow of processing performed in the writing initialization at Step S1015 in FIG. 10. When it is determined that log acquisition is performed at Step S1010 in FIG. 10, this processing starts at Step S1200.

First, at Step S1205, it is determined whether the set mode is 2 or 3 out of the mode numbers in the combination table illustrated in FIG. 11.

When the mode number is 2 or 3, the flow advances to Step S1210, where it is determined whether access to the memory 22 has started. When access has not been started, the determination processing at Step S1210 is repeated until the access starts. At Step S1215, it is determined whether the mode number is 3. When the mode number is not 3, the flow advances to Step S1275 to end this processing.

When it is determined that the mode number is not 2 or 3 at Step S1205, the flow advances to Step S1220, where it is determined whether the mode number is 4 or 5. When the mode number is 4 or 5, the flow advances to Step S1225, where a module is set by the module selection section 37. At Step S1230, it is determined whether the module has started access to the memory 22.

When the module does not start access to the memory 22, the determination processing at Step S1230 is repeated until the access starts. At Step S1235, it is determined whether the mode number is 5. When the mode number is not 5, the flow advances to Step S1275 to end this processing.

When it is determined that the mode number is 5 at Step S1235, or when it is determined that the mode number is 3 at Step S1215, the flow advances to Step S1240, where occupation time data held by the occupation time holding section 40 is erased and reset to start the timer 39 in order to measure occupation time at Step S1245. The processing in the writing initialization thereby ends, and the flow advances to Step S1275.

When it is determined that the mode number is neither 4 nor 5 at Step S1220, the flow advances to Step S1250. In this case, the mode number is 6 or 7. At Step S1250, time when the timing setting unit 38 starts generation of a log is set, and at Step S1255, the timer 39 starts.

At Step S1260, it is determined whether time measured by the timer 39 has reached the set time. When the time measured has not reached the time set, the determination processing at Step S1260 is repeated. When the time measured has reached the time set, by contrast, the flow advances to Step S1265, where it is determined whether the mode number is 7. When the mode number is not 7 but 6, the flow advances to Step S1275 to end this processing.

When it is determined that the mode number is 7 at Step S1265, the flow advances to Step S1270, where occupation time data held by the occupation time holding section 40 is erased and reset. Subsequently, the flow advances to Step S1275 to end this writing initialization. Performing this processing allows initialization of log writing timing and log content granularity.

Figure 13:
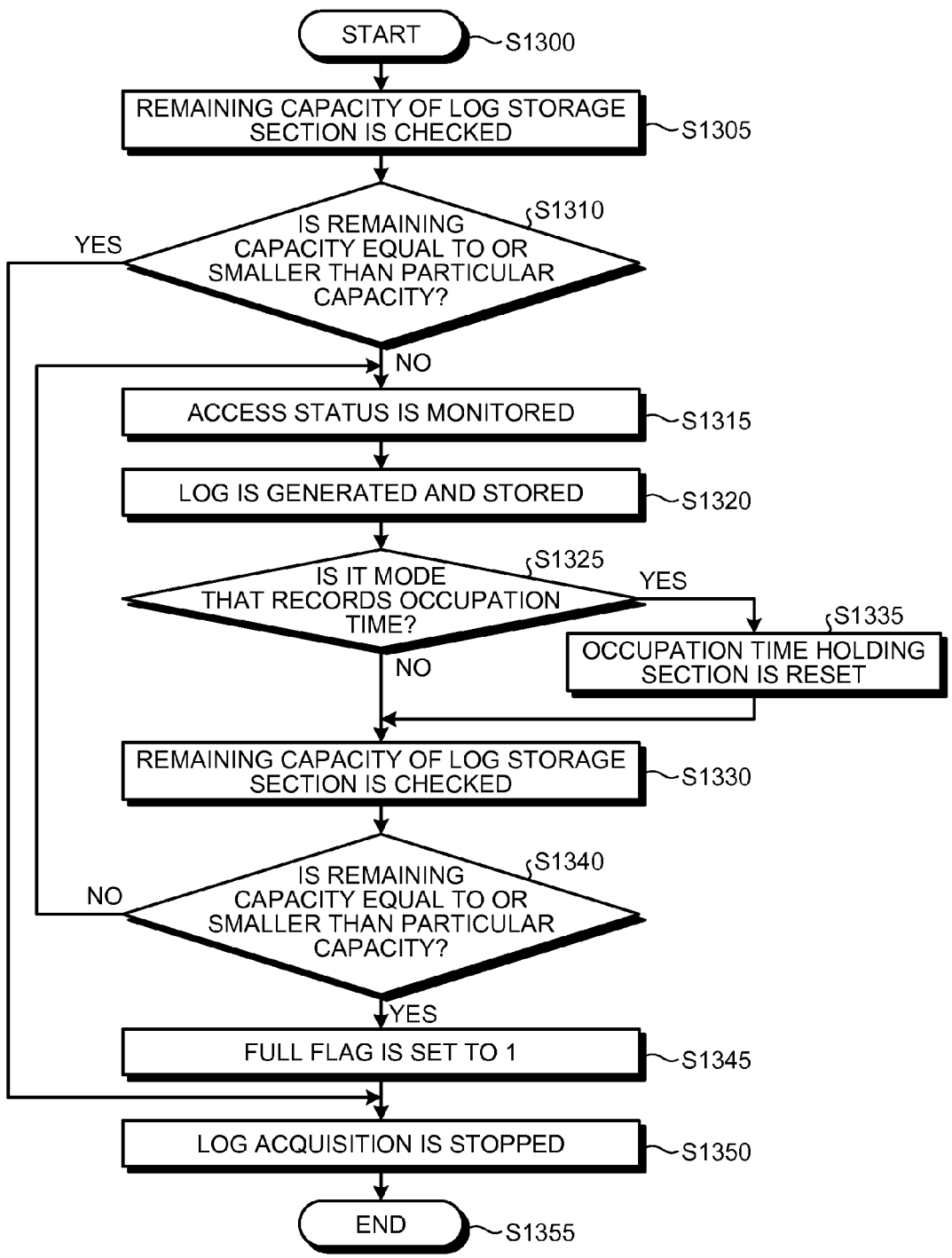
FIG. 13 is a flowchart illustrating the flow of writing processing at Step S1025 in FIG. 10.

FIG. 13 is a flowchart illustrating the flow of writing processing performed at Step S1025 in FIG. 10. This processing starts when the first log writing has ended at Step S1300. At Step S1305, the remaining capacity of the log storage section 33 at that time is checked. At Step S1310, it is determined whether the remaining capacity is equal to or smaller than a particular capacity.

When it is determined that the remaining capacity is equal to or smaller than the particular capacity, the flow advances to Step S1350. At Step S1350, log acquisition stops because the remaining capacity is small. When it is determined that the remaining capacity exceeds the particular capacity, by contrast, the flow advances to Step S1315. Writing processing continues because the remaining capacity is enough. In other words, the access monitor 31 monitors access status to the memory 22 by a module, and detects that modules have been switched. Subsequently, at Step S1320, the log generation section 32 generates a log, and stores the generated log in the log storage section 33.

At Step S1325, it is determined whether the content in the log include the mode number of a mode that records occupation time. When it is not the case, the flow advances directly to Step S1330. When it is the case, the flow advances to Step S1335. At Step S1335, data occupation time data held by the occupation time holding section 40 is erased and reset, and the flow advances to Step S1330.

At Step S1330, the remaining capacity determination section 34 checks the remaining capacity of the log storage section 33 to determine whether the remaining capacity has become equal to or smaller than the particular capacity at Step S1340. When it is determined that the remaining capacity has become equal to or smaller than the particular capacity, the flow advances to Step S1345, where a FULL flag is set to 1, and the flow advances to Step S1350. When it is determined that the remaining capacity exceeds the particular capacity, the flow returns to Step S1315, and then the monitoring, the generating and storage of a log, the determination of whether the mode is the mode that records occupation time, the resetting of the occupation time holding section 40, the checking and determination of the remaining capacity are performed at Step S1315 to Step S1340.

At Step S1350, the log generation section 32 stops log generation and log acquisition because the remaining capacity of the log storage section 33 becomes smaller. This writing processing ends at Step S1355.

Figure 14:
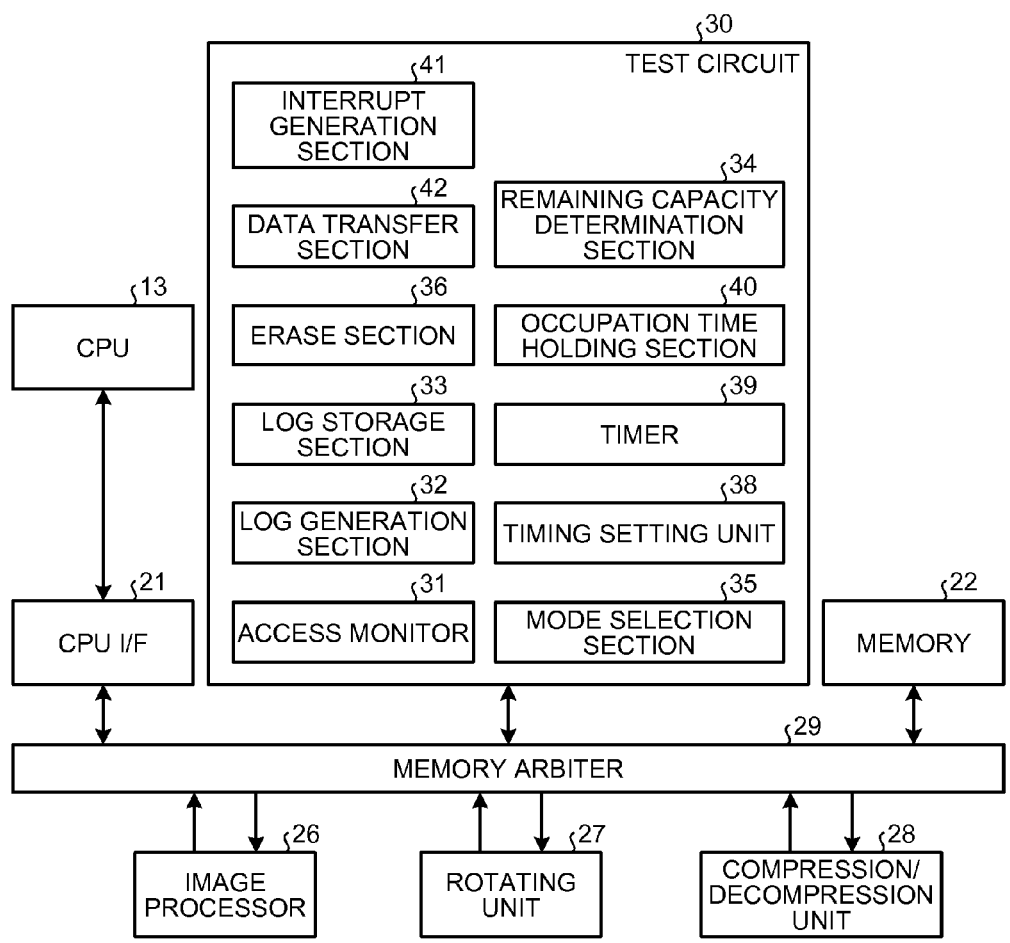
FIG. 14 is a functional block diagram illustrating a fifth embodiment of the operation analysis apparatus.

FIG. 14 is a functional block diagram illustrating a fifth embodiment of the operation analysis apparatus. The configuration illustrated in FIG. 14 is further provided with, in addition to the configuration illustrated in FIG. 9, an interrupt generation section 41 as an interrupt generation unit that generates an interrupt in image processing performed by a module and directs all the modules to stop access requests to the memory 22.

This configuration is provided with a data transfer section 42 as a data transfer unit that transfers logs stored in the log storage section 33 to a storage device, that is, the memory 22 or the external storage device 12, other than the log storage section 33. Because those other than the interrupt generation section 41 and the data transfer section 42 have been already described above, the description therefor will be omitted here.

The interrupt generation section 41 notifies the CPU 13, as an interrupt, of a case that the remaining capacity of the log storage section 33 has been almost exhausted or a case that the data within the log storage section 33 has emptied. The data transfer section 42 controls the memory arbiter 29 in order to output data stored in the log storage section 33 to the memory 22.

This allows the mode selection section 35 to select, apart from the log acquisition mode, a mode that allows log acquisition again by once transferring logs to the memory 22 or the external storage device 12 when the remaining capacity of the log storage section 33 has become equal to or smaller than the particular capacity. In other words, in the mode that allows log acquisition again, when logs have been accumulated to the extent that the remaining capacity of the log storage section 33 becomes equal to or smaller than the particular capacity, the interrupt generation section 41 issues an interrupt to the CPU 13 to stop operation once. The data transfer section 42 controls the memory arbiter 29 and transfers the accumulated logs to the memory 22 via the memory arbiter 29. When all of the logs have been transferred, the interrupt generation section 41 issues an interrupt to the CPU 13 again to restart log acquisition.

With reference to FIG. 15, described in detail is processing performed by the operation analysis apparatus that further includes the interrupt generation section 41 and the data transfer section 42. This processing starts at Step S1500, and initialization of the test circuit 30 is performed at Step S1505. The flow of processing in this initialization is the same as the flow of processing illustrated in FIG. 3. However, mode identification information for identifying a mode is set because the number of modes is large. The mode identification information includes, as an example, the above-described mode number.

At Step S1510, based on a set mode number, it is determined whether log acquisition is performed. In other words, it is determined whether the mode number in the combination table in FIG. 11 is 1. When the mode number is 1, the flow advances to Step S1630 to end this processing. When the mode number is other than 1, the flow advances to Step S1515.

At Step S1515, an EMPTY flag, which indicates that the remaining capacity of the log storage section 33 has become small and any additional log cannot be stored, is reset to set the EMPTY flag to 0. At Step S1520, writing initialization on log writing timing and log content granularity in accordance with the mode is performed. This writing initialization is the same as the processing illustrated in FIG. 12. When the writing initialization ends, the first log is generated and stored in the log storage section 33 at Step S1525.

At Step S1530, the same processing as the writing processing illustrated in FIG. 13 is performed. At Step S1535, it is determined whether a mode set by the mode selection section 35 is a mode that transfers logs to the memory 22 every time the remaining capacity of the log storage section 33 becomes equal to or smaller than the particular capacity. When it is not the case, the flow advances to Step S1540, where the accumulated logs are output to the memory 22 or the external storage device 12 after completion of main body operation to end this processing at Step S1630.

When the mode is a mode that transfers logs every time the remaining capacity becomes equal to or smaller than the particular capacity, the flow advances to Step S1545, where it is determined whether access to the bus is continuing. When it is not continuing, because this indicates absence of an access request to the memory 22 from a module, the flow advances to Step S1540, where the logs so far accumulated are output to the memory 22 or the external storage device 12 to end this processing at Step S1630.

When access to the bus is continuing, because that indicates that an access request to the memory 22 from a module is still present and that a log to be stored is present, the flow advances to Step S1550, where the interrupt generation section 41 generates an interrupt for the CPU 13. The CPU 13, at Step S1555, outputs an instruction to stop access to the bus to all the modules. At Step S1560, the timer 39 provided in the test circuit 30 is temporarily stopped.

At Step S1565, the module selection section 37 sets, as a log acquisition start flag, the module name of a module that has accessed the memory 22 last. At Step S1570, logs are output to the memory 22 or the external storage device 12. At Step S1575, it is determined whether the log storage section 33 has emptied. When it has emptied, the flag is set to 1 at Step S1580, and the flow then advances to Step S1585.

When it is determined that the log storage section 33 has not emptied at Step S1575, the flow returns to Step S1570, where logs are output again. At Step S1585, the flag is set to 0 again, and an interrupt is generated for the CPU 13 at Step S1590. At Step S1595, the CPU 13 outputs an instruction to restart access to the bus to all the modules. At Step S1600, the interrupt is reset.

At Step S1605, it is determined whether access to the memory 22 has restarted actually. When the access has not restarted, the determination processing at Step S1605 is repeated until the access restarts. When the access is restarted, the flow advances to Step S1610, where it is determined whether the access to the memory 22 is made by the last module that accessed the memory 22 to be stopped by the interrupt. When the access is found to be made by the same module, the flow advances to Step S1625.

When the access is found to be by a different module, by contrast, the flow advances to Step S1615, where a log is generated and stored in the log storage section 33 because modules have been switched. At Step S1620, occupation time data held by the occupation time holding section 40 is erased and reset. After the resetting, the flow advances to Step S1625.

At Step S1625, the timer 39 restarts, and the flow returns to Step S1530, where log-writing processing is performed. In other words, the processing is performed, in which the switching of modules either of which accesses the memory 22 is monitored, and a log is generated and stored at the time of switching.

Until no access request to the memory 22 is detected, monitoring of the access status, generation of a log, storage of it in the log storage section 33, an interrupt when the remaining capacity of the log storage section 33 has been exhausted, log outputting, and restarting of monitoring are repeated. By thus recording logs, operation of the memory arbiter 29 can be analyzed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An operation analysis apparatus for analyzing operation of an arbitration unit included in an image forming apparatus comprising a storage unit, the arbitration unit configured to control access to the storage unit, and a plurality of image processing units configured to be connected to the arbitration unit, access the storage unit via the arbitration unit, and perform respective different pieces of image processing on image data, the operation analysis apparatus comprising:
    a test circuit configured to monitor which of the image processing units the arbitration unit permits access to the storage unit;
    a log generation unit configured to, in response to the fact that the access monitoring unit detects that the arbitration unit has switched the image processing unit with access to the storage unit permitted, generate information on the image processing unit with access permitted as a log;
    a log storage unit configured to store therein the generated log;
    a remaining capacity determination unit configured to determine whether the storage capacity of the log storage unit after storing the log has become equal to or smaller than a desired capacity;
    a selection unit configured to receive selection of the image processing unit; and
    the log generation unit, in response to the fact that the access monitoring unit detects start of access to the storage unit by the selected image processing unit, is configured to start the generation of the log.

2. The operation analysis apparatus according to claim 1, further comprising:
    a setting unit configured to receive time after which the generation of the log starts and set the time; and
    a measuring unit configured to measure time, wherein the log generation unit is configured to start the generation of the log when the time measured by the measuring unit has reached the set time.

3. The operation analysis apparatus according to claim 1, further comprising:
    a measuring unit configured to measure time after which the image processing unit is switched; and
    an occupation time holding unit configured to hold the measured time as occupation time.

4. The operation analysis apparatus according to claim 1, further comprising:
    an interrupt generation unit configured to, when the remaining capacity determination unit determines the storage capacity has become equal to or smaller than the particular capacity, generate an interrupt for image processing performed by the image processing unit with access to the storage unit permitted and direct all the image processing units to stop an access request to the storage unit; and
    a transfer unit configured to control the arbitration unit to transfer the log stored in the log storage unit to the storage unit or another storage unit via the arbitration unit.

5. The operation analysis apparatus according to claim 4, further comprising:
    an erase unit configured to, in response to the fact that the transfer of the log by the transfer unit has ended, erase the log stored in the log storage unit; and
    an interrupt cancel unit configured to cancel the interrupt and direct all the image processing units to restart an access request to the storage unit, wherein
    when the image processing unit that accessed the storage unit when the interrupt was generated differs from the image processing unit that was permitted to access the storage unit after restart of the access request, the log generation unit is configured to generate information on the image processing unit that accessed the storage unit when the interrupt was generated as a log.

6. The operation analysis apparatus according to claim 1, wherein the arbitration unit is further configured to grant access to the storage unit based on a processing priority of each of the plurality of image processing units.

7. The operation analysis apparatus according to claim 6, wherein the arbitration unit is further configured to provide equal access to the storage unit to each of the plurality of image processing units.

8. An operation analysis method that is performed by an operation analysis apparatus for analyzing operation of an arbitration unit included in an image forming apparatus comprising a storage unit, the arbitration unit configured to control access to the storage unit, and a plurality of image processing units configured to be connected to the arbitration unit, access the storage unit via the arbitration unit, and perform respective different pieces of image processing on image data, the operation analysis method comprising:
    monitoring, using at least one processor, which of the image processing units the arbitration unit permits access to the storage unit;
    generating, using the at least one processor, in response to the fact that it is detected the arbitration unit has switched the image processing unit with access to the storage unit permitted, information on the image processing unit with access permitted as a log;
    storing, using the at least one processor, the generated log in a log storage unit;
    determining, using the at least one processor, whether the storage capacity of the log storage unit after storing the log has become equal to or smaller than a particular capacity;
    receiving, using the at least one processor, selection of the image processing unit; and
    starting, using the at least one processor, generation of the log, in response to the fact that it is detected the selected image processing unit has started access of the storage unit.

9. The operation analysis method according to claim 8, further comprising:
    receiving, using the at least one processor, time after which the generation of the log starts and set time;
    measuring, using the at least one processor, the time; and
    starting the generation of the log when the measured time has reached the set time.

10. The operation analysis method according to claim 8, further comprising:
    measuring, using the at least one processor, time after which the image processing unit is switched; and
    holding, using the at least one processor, the measured time as occupation time.

11. The operation analysis method according to claim 8, further comprising:
    generating, using the at least one processor, an interrupt for image processing performed by the image processing unit with access to the storage unit permitted and direct all the image processing units to stop an access request to the storage unit when the remaining capacity determination unit determines the storage capacity has become equal to or smaller than the particular capacity; and controlling, using the at least one processor, the arbitration unit to transfer the log stored in the log storage unit to the storage unit or another storage unit via the arbitration unit.

12. The operation analysis method according to claim 11, further comprising:

erasing, using the at least one processor, the log stored in the log storage unit in response to the fact that the transfer of the log by the transfer unit has ended;

canceling, using the at least one processor, the interrupt and directing all the image processing units to restart an access request to the storage unit, when the image processing unit that accessed the storage unit when the interrupt was generated differs from the image processing unit that was permitted to access the storage unit after restart of the access request; and generating, using the at least one processor, information on the image processing unit that accessed the storage unit when the interrupt was generated as a log.

13. The operation analysis method according to claim 8, further comprising:

granting, using the at least one processor, access to the storage unit based on a processing priority of each of the plurality of image processing units.

14. The operation analysis method according to claim 13, further comprising:

providing, using the at least one processor, equal access to the storage unit to each of the plurality of image processing units.

15. A computer program product comprising a non-transitory computer-readable medium having a computer-readable program for executing an operation analysis method that is performed by an operation analysis apparatus for analyzing operation of an arbitration unit included in an image forming apparatus comprising a storage unit, the arbitration unit configured to control access to the storage unit, and a plurality of image processing units configured to be connected to the arbitration unit, access the storage unit via the arbitration unit, and perform respective different pieces of image processing on image data, wherein the operation analysis method comprises:

monitoring, using at least one processor, which of the image processing units the arbitration unit permits access to the storage unit;

generating, using the at least one processor, in response to the fact that it is detected the arbitration unit has switched the image processing unit with access to the storage unit permitted, information on the image processing unit with access permitted as a log;

storing, using the at least one processor, the generated log in a log storage unit;

determining, using the at least one processor, whether the storage capacity of the log storage unit after storing the log has become equal to or smaller than a particular capacity;

receiving, using the at least one processor, selection of the image processing unit; and starting, using the at least one processor, generation of the log, in response to the fact that it is detected the selected image processing unit has started access of the storage unit.

16. The computer program product according to claim 15, the operation analysis method further comprising:

receiving, using the at least one processor, time after which the generation of the log starts and set time;

measuring, using the at least one processor, the time; and starting the generation of the log when the measured time has reached the set time.

17. The computer program product according to claim 15, the operation analysis method further comprising:

measuring, using the at least one processor, time after which the image processing unit is switched; and holding, using the at least one processor, the measured time as occupation time.

18. The computer program product according to claim 15, the operation analysis method further comprising:

generating, using the at least one processor, an interrupt for image processing performed by the image processing unit with access to the storage unit permitted and direct all the image processing units to stop an access request to the storage unit when the remaining capacity determination unit determines the storage capacity has become equal to or smaller than the particular capacity; and controlling, using the at least one processor, the arbitration unit to transfer the log stored in the log storage unit to the storage unit or another storage unit via the arbitration unit.

19. The computer program product according to claim 18, the operation analysis method further comprising:

erasing, using the at least one processor, the log stored in the log storage unit in response to the fact that the transfer of the log by the transfer unit has ended;

canceling, using the at least one processor, the interrupt and directing all the image processing units to restart an access request to the storage unit, when the image processing unit that accessed the storage unit when the interrupt was generated differs from the image processing unit that was permitted to access the storage unit after restart of the access request; and generating, using the at least one processor, information on the image processing unit that accessed the storage unit when the interrupt was generated as a log.

20. The computer program product according to claim 15, the operation analysis method further comprising:

granting, using the at least one processor, access to the storage unit based on a processing priority of each of the plurality of image processing units.

21. An operation analysis apparatus for analyzing operation of an arbitration unit included in an image forming apparatus comprising a storage unit, the arbitration unit configured to control access to the storage unit, and a plurality of image processing units directly connected to the arbitration unit, and configured to access the storage unit through the directly connected arbitration unit, and perform respective different pieces of image processing on image data, the operation analysis apparatus comprising:

a test circuit configured to monitor which of the image processing units the arbitration unit permits access to the storage unit;

a log generation unit configured to, in response to the fact that the access monitoring unit detects that the arbitration unit has switched the image processing unit with access to the storage unit permitted, generate information on the image processing unit with access permitted as a log;

a log storage unit configured to store therein the generated log; and a remaining capacity determination unit configured to determine whether the storage capacity of the log storage unit after storing the log has become equal to or smaller than a desired capacity.

* * * * *